(12) United States Patent
Suzuki

(10) Patent No.: US 11,079,989 B2
(45) Date of Patent: Aug. 3, 2021

(54) PRINTING SYSTEM, PRINTING METHOD, IMAGE FORMING APPARATUS AND METHOD FOR CONTROLLING THE SAME, AND COMPUTER-READABLE MEDIUM

(71) Applicant: CANON KABUSHIKI KAISHA, Tokyo (JP)

(72) Inventor: Shinya Suzuki, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/298,497

(22) Filed: Mar. 11, 2019

(65) Prior Publication Data

US 2019/0303057 A1    Oct. 3, 2019

(30) Foreign Application Priority Data

Mar. 27, 2018    (JP) .............................. JP2018-060734

(51) Int. Cl.
*G06F 3/12*    (2006.01)

(52) U.S. Cl.
CPC ............ *G06F 3/126* (2013.01); *G06F 3/1205* (2013.01); *G06F 3/1247* (2013.01); *G06F 3/1288* (2013.01); *G06F 3/1292* (2013.01)

(58) Field of Classification Search
CPC ...... G06F 3/126; G06F 3/1205; G06F 3/1247; G06F 3/1288; G06F 3/1292; G06F 3/1276; G06F 3/1275; G06F 3/1222
See application file for complete search history.

(56) References Cited

U.S. PATENT DOCUMENTS

| 6,369,907 | B1* | 4/2002 | Aoki ..................... G06F 3/1204 358/1.15 |
| 6,567,184 | B2 | 5/2003 | Aoki |
| 9,019,524 | B2 | 4/2015 | Tokumaru |
| 9,374,620 | B2 | 6/2016 | Yamagishi |
| 10,650,292 | B2 | 5/2020 | Matsui |
| 2007/0115493 | A1 | 5/2007 | Haginaka et al. |

(Continued)

FOREIGN PATENT DOCUMENTS

| CN | 1219710 A | 6/1999 |
| CN | 1967557 A | 5/2007 |

(Continued)

OTHER PUBLICATIONS

Chinese Office Action dated Oct. 10, 2020, in related Chinese Patent Application No. 201910229892.5.

*Primary Examiner* — Iriana Cruz

(74) *Attorney, Agent, or Firm* — Venable LLP

(57) ABSTRACT

A printing system includes a terminal device, an image forming apparatus, and a server. The terminal device makes an inquiry to the image forming apparatus, receives information for specifying the server as a designation of print data, and sends print data to the server specified by the received information. The image forming apparatus causes the image forming apparatus to transmit the information for specifying the server as a designation of print data to be transmitted from the terminal device in a response to the received inquiry, acquires the print data the terminal device has transmitted to the specified server from the specified server, and executes a printing process based on the acquired print data.

22 Claims, 8 Drawing Sheets

(56) References Cited

U.S. PATENT DOCUMENTS

| | | | | |
|---|---|---|---|---|
| 2011/0037995 A1* | 2/2011 | Wang | ................... | G06F 3/1253 |
| | | | | 358/1.15 |
| 2012/0050804 A1* | 3/2012 | Ohara | ................... | G06F 3/1292 |
| | | | | 358/1.15 |
| 2015/0002884 A1* | 1/2015 | Okumura | .............. | G06F 3/1268 |
| | | | | 358/1.14 |
| 2016/0267192 A1 | 9/2016 | Yamagishi | | |
| 2019/0050184 A1* | 2/2019 | Ozawa | ................. | G06F 3/1276 |

FOREIGN PATENT DOCUMENTS

| | | | |
|---|---|---|---|
| CN | 103858366 | A | 6/2014 |
| CN | 103945081 | A | 7/2014 |
| CN | 107168658 | A | 9/2017 |
| CN | 107783738 | A | 3/2018 |
| JP | 4033857 | B2 | 1/2008 |

* cited by examiner

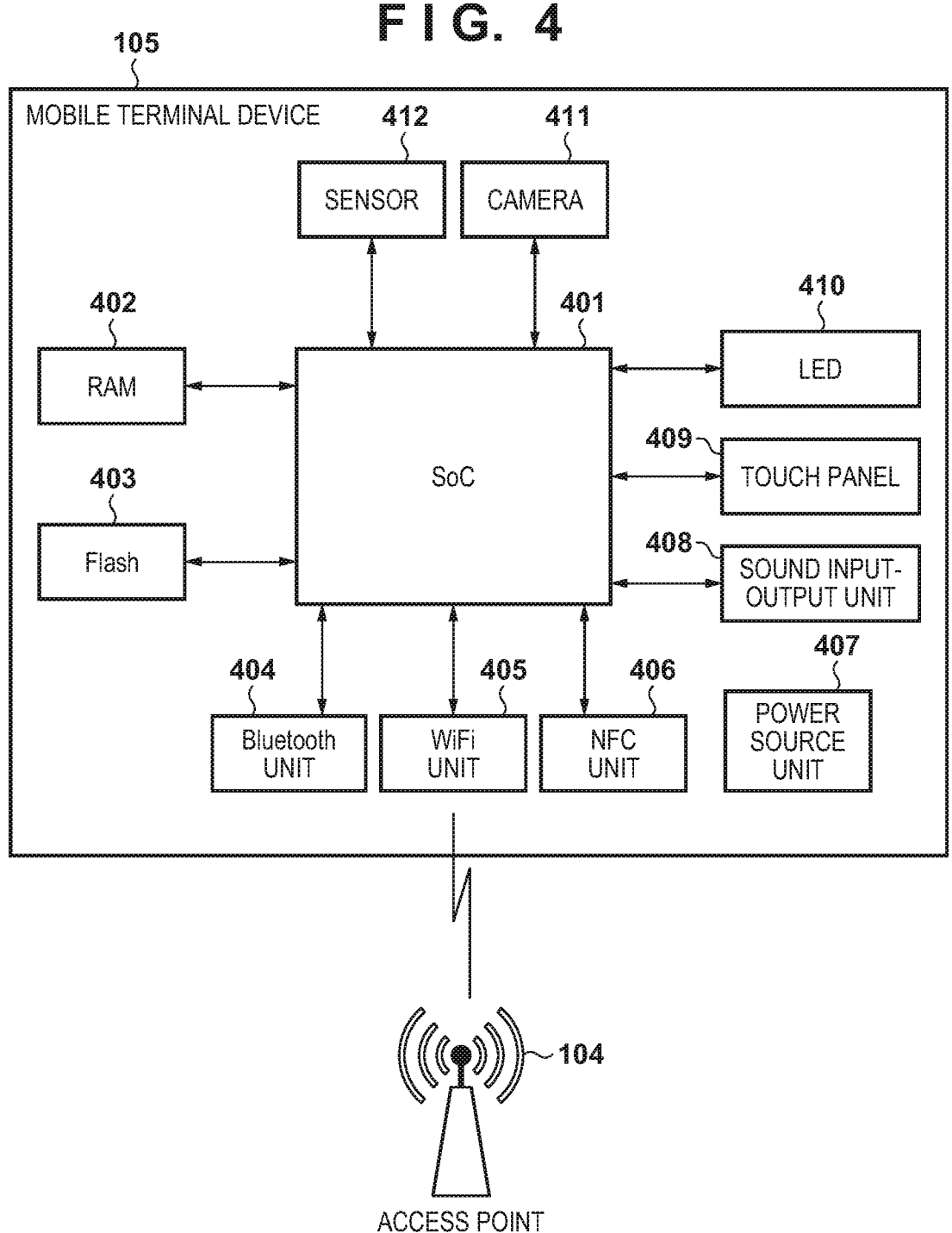

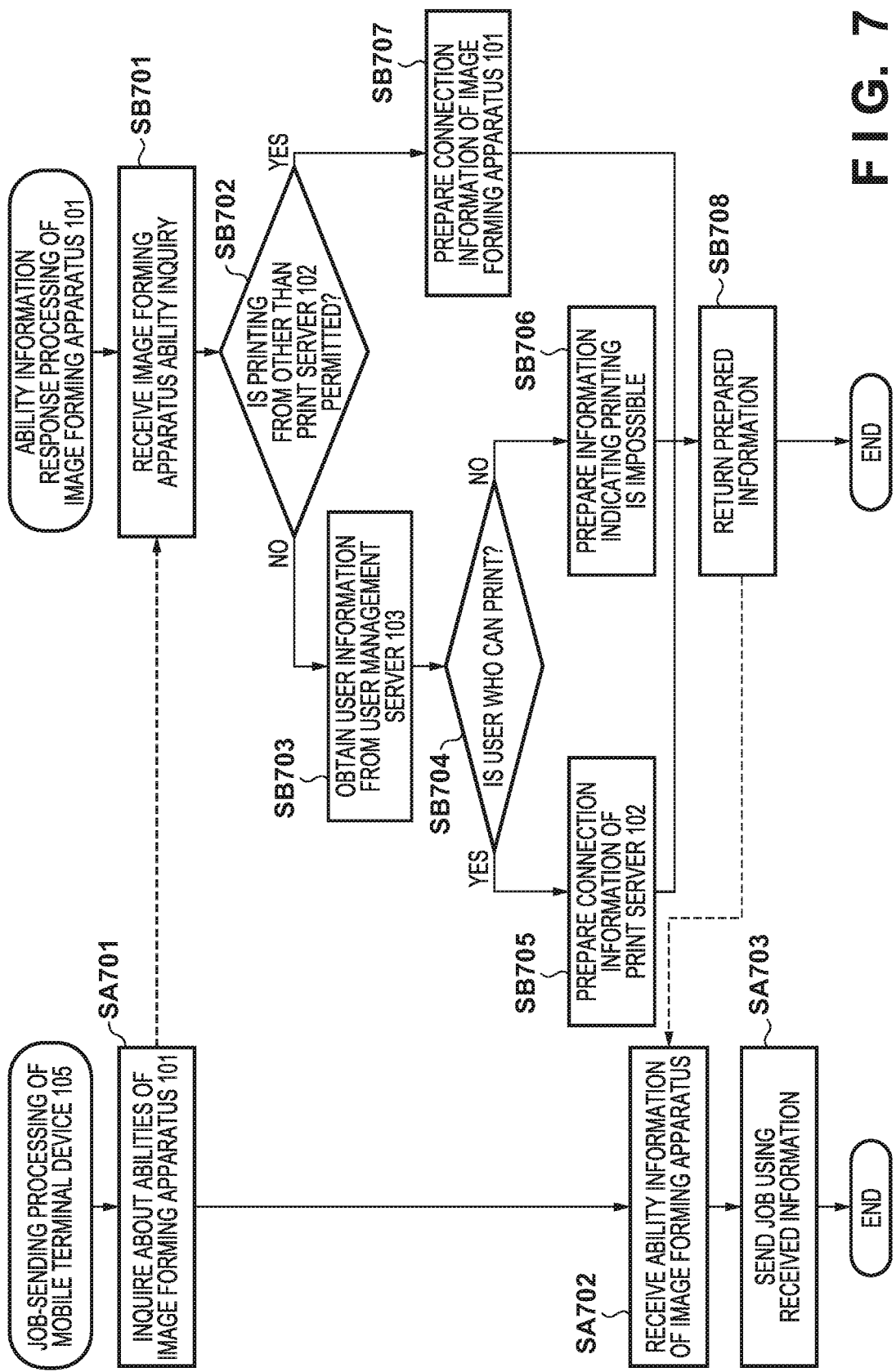

PRINTING SYSTEM, PRINTING METHOD, IMAGE FORMING APPARATUS AND METHOD FOR CONTROLLING THE SAME, AND COMPUTER-READABLE MEDIUM

BACKGROUND OF THE INVENTION

Field of the Invention

The present invention relates to a printing system, a printing method, an image forming apparatus and a method for controlling the same, and a computer-readable medium.

Description of the Related Art

Mobile terminal devices such as smartphones are becoming more and more widely used in recent years, and print functions have been standardly supported by the operating systems (e.g. Android (registered trademark) OS) of those devices. A mobile terminal device in which a standard search function and print function are preinstalled can use more printers at low cost by using only a specific standard technique. Examples of such functions may include Bonjour, which is a search protocol that has been recently widely employed as a technique for performing printing from a mobile terminal device, PWG-Raster, which is a print data format, IPP (Internet Printing Protocol), which is a data-sending protocol, and the like.

Meanwhile, a printing system of a so-called "pull-print" type has conventionally been proposed that enables print data to be output from a printing apparatus by a user making, from the printing apparatus, a request to perform printing of print data that is temporarily stored in a server (e.g. see Japanese Patent No. 4033857). With this system, the user can output printing data from a desired printing apparatus, rather than outputting printing data to a specific printing apparatus, when performing printing from an application.

SUMMARY OF THE INVENTION

According to an aspect of the present invention, one of the objects is to improve the convenience of printing from a mobile terminal device in an environment in which a pull-printing system is constructed.

According to another aspect of the present invention, one of the objects is to improve user convenience when performing printing using a mobile terminal, a server, and an image forming apparatus.

According to one aspect of the present invention, there is provided a printing system that includes a terminal device, an image forming apparatus, and a server, the terminal device comprising: a processor and a memory storing instructions which, when executed by the processor of the terminal device, cause the terminal device to: make an inquiry to the image forming apparatus; and send a print job based on information indicated in a response to the inquiry, and the image forming apparatus comprising: a processor and a memory storing instructions which, when executed by the processor of the image forming apparatus, cause the image forming apparatus to include information needed for printing performed via the server in the response to the inquiry, and send the response.

According to another aspect of the present invention, there is provided a printing method to be performed in a printing system that includes a terminal device, an image forming apparatus, and a server, the method comprising: making an inquiry to the image forming apparatus, by the terminal device; sending a print job based on information indicated in a response to the inquiry, by the terminal device; and including information needed for printing performed via the server in the response to the inquiry and sending the response, by the image forming apparatus.

According to another aspect of the present invention, there is provided an image forming apparatus capable of communicating with a terminal device and a server, the apparatus comprising: a processor and a memory storing instructions which, when executed by the processor, cause the image forming apparatus to: accept an inquiry from the terminal device; and include information needed for printing performed via the server in the response to the inquiry, and send the response.

According to another aspect of the present invention, there is provided a method for controlling an image forming apparatus capable of communicating with a terminal device and a server, the method comprising: accepting an inquiry from the terminal device; and including information needed for printing performed via the server in a response to the inquiry, and sending the response.

According to another aspect of the present invention, there is provided a computer-readable medium storing a program for causing a computer to function to: accept an inquiry from a terminal device; and include information needed for printing performed via a server in the response to the inquiry, and send the response.

According to an aspect of the present invention, printing can be performed from a mobile terminal device using a standard print function without impairing convenience, even in an environment in which a full-print system is constructed.

Further features of the present invention will become apparent from the following description of exemplary embodiments (with reference to the attached drawings).

BRIEF DESCRIPTION OF THE DRAWINGS

FIG. 4 shows an example of a hardware configuration of a mobile terminal device according to the present embodiment.

FIG. 7 is a flowchart related to job-sending processing according to the present embodiment.

DESCRIPTION OF THE EMBODIMENTS

In a pull-printing system such as one described in Japanese Patent No. 4033857, it is conceivable to configure the system so as to permit only printing of print data that is performed via a server and not allow direct output from a mobile terminal device to an image forming apparatus. Meanwhile, it is conceivable to perform printing from a mobile terminal device that includes a standard print function unit. At this time, even if an image forming apparatus is determined as a printer for output by means of a search function of the standard print function unit, printing cannot be performed in an environment in which print data needs to be sent via the aforementioned print server.

In the following embodiment of the present invention, a mechanism is provided that can provide information required to perform printing via a print server as a response to an inquiry of a search from outside, such that a printer server can be found using a search function of a standard print function unit of a mobile terminal device. A description will be given below using the drawings.

System Configuration

Figure 1:
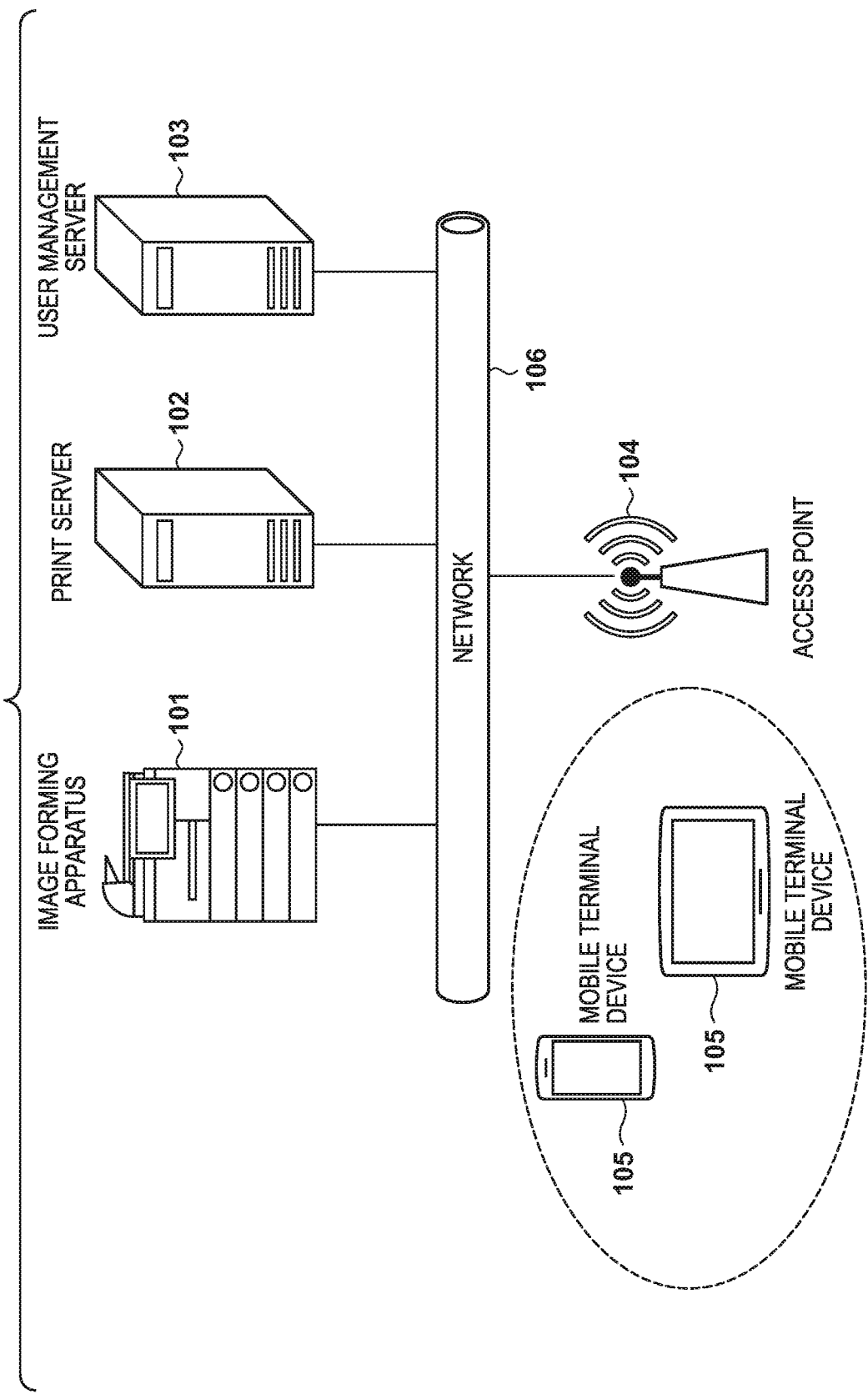
FIG. 1 shows an example of a network configuration according to the present embodiment.

FIG. 1 shows an example of a network configuration of a printing system according to the present invention. The printing system according to the present embodiment includes an image forming apparatus 101, a print server 102, and a user management server 103. The apparatuses are communicably connected to each other via a network 106. A mobile terminal device 105 can be connected to the network 106 via an access point 104.

The image forming apparatus 101 can receive print data in a page description language (hereinafter, "PDL") format, and perform printing. In the present embodiment, it is envisioned that the image forming apparatus 101 conforms to a print data format and a data-sending protocol to which a standard print function unit included in the operating system (OS) of the mobile terminal device 105 conforms. The details of the standard print function unit will be described later with reference to FIGS. 5A to 5C. Although the present embodiment describes a multi-function printer (MFP) that has a print function, a scan function, and a copy function, this may not be the case. For example, the invention of the present application may also be applied to a single-function printer (SFP) that only has a print function.

The print server 102 accepts a print job, and saves the received print job in a predetermined storing area. The print server 102 also has a later-described job management DB, and controls print jobs. The print server 102 also manages image data that is to be printed.

The user management server 103 manages user information using a later-described user management DB. The present embodiment is based on a premise that information regarding the mobile terminal device 105 and information regarding a user who uses the mobile terminal device 105 are already registered.

The mobile terminal device 105 is, for example, a smartphone, a tablet terminal, or the like, and has a function of wirelessly communicating with external devices. The mobile terminal device 105 can connect to the network 106 via the access point 104, and communicate with the image forming apparatus 101, the print server 102, and the user management server 103. The mobile terminal device 105 according to the present embodiment has a standard print function unit that provides a standard print function. Operations of the standard print function unit will be described later with reference to the drawings.

Although the number of each type of apparatus is one in FIG. 1, the number of each type of apparatus may be more than one. The method of communication between each apparatus and the network 106 is not limited to either a wired or wireless method, and the network 106 may be configured by combining networks that use different methods.

Apparatus Configuration

Image Forming Apparatus

Figure 2:
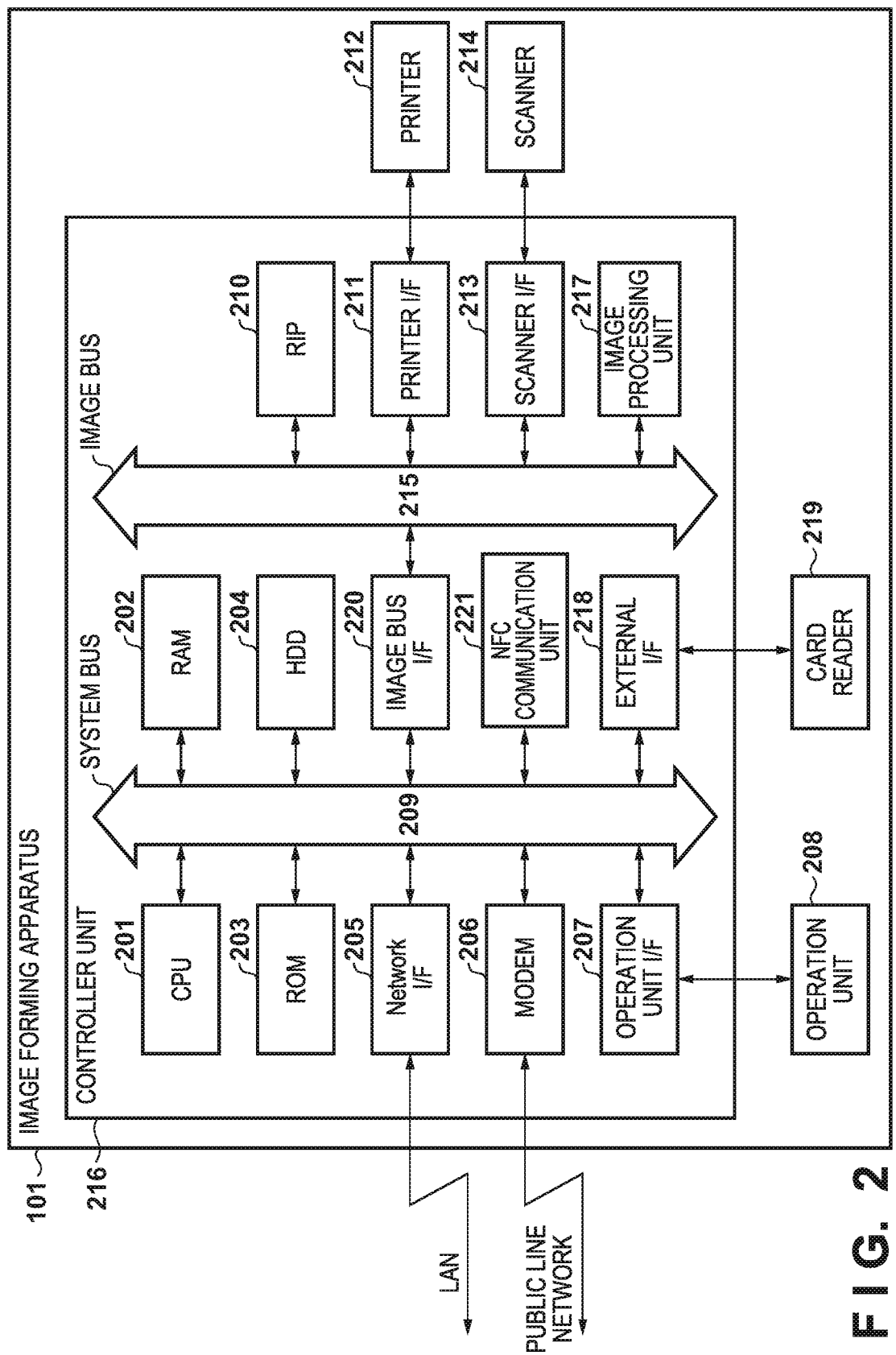
FIG. 2 shows a hardware configuration of an image forming apparatus according to the present embodiment.

FIG. 2 is a block diagram showing an example of a hardware configuration of the image forming apparatus 101 according to the present embodiment shown in FIG. 1. In FIG. 2, the image forming apparatus 101 includes a controller unit 216, an operation unit 208, a printer 212, a scanner 214, and a card reader 219. The scanner 214 functions as an image input device for reading images. The printer 212 is a printing unit, and functions as an image output device for performing a printing operation. The controller unit 216 connects to a LAN (Local Area Network) or a public line (WAN) to input and output image data and device information. In the controller unit 216, a CPU (Central Processing Unit) 201 is a processor for controlling the entire system. A RAM (Random Access Memory) 202 is a system work memory for the CPU 201 to operate, and also serves as a program memory for recording programs and an image memory for temporarily recording image data. A ROM (Read Only Memory) 203 is a nonvolatile storage area, in which a boot program and various control programs for the system are stored. An HDD (Hard Disk Drive) 204 is a nonvolatile storage area, and stores various programs for controlling the system, image data, and the like.

An operation unit I/F 207 is an interface unit for the operation unit 208, and outputs image data to be displayed on the operation unit 208 to the operation unit 208. The operation unit I/F 207 has a function of communicating information (e.g. user information etc.) input by a user of the system from the operation unit 208 to the CPU 201. The operation unit 208 includes a display unit (not shown) with a touch panel, and the user can give various instructions by pressing (e.g. touching with a finger) buttons displayed on this display unit. The network I/F 205 is an interface for connecting to the network (LAN) to input and output data. A modem 206 connects to a public line to input and output data, e.g. send and receive FAX data.

An external I/F 218 is an interface unit for accepting input from outside, such as input made through a USB, IEEE1394, a printer port, RS-232C, or the like. In the present embodiment, the card reader 219 for reading an IC card, which is required for authentication, is connected to the external I/F 218. The CPU 201 can control, via the external I/F 218, the card reader 219 reading information from an IC card and obtain the information read from the IC card. The CPU 201 can also use, in authentication, an NFC communication unit 221 for controlling short-range wireless communication that is based on NFC (Near Field Communication). The above-listed devices are arranged on a system bus 209 so as to be able to communicate with each other.

An image bus I/F 220 is a bus bridge for connecting the system bus 209 to an image bus 215 that rapidly transfers image data, and converting a data structure. The image bus 215 is constituted by a PCI bus or IEEE1394. The following devices are arranged on the image bus 215 so as to be able to communicate with each other. An RIP (Raster Image Processor) 210 develops vector data, such as a PDL code, into a bitmap image, for example. A printer I/F 211 is an interface for connecting the printer 212 to the controller unit 216 and synchronously or asynchronously converting image data. A scanner I/F 213 is an interface for connecting the scanner 214 to the controller unit 216, and synchronously or asynchronously converting image data. An image processing unit 217 corrects, processes, and edits input image data, and also corrects the printer and converts the resolution, for example, for print-output image data. In addition, the image processing unit 217 rotates image data, and performs compression and decompression processing, such as JPEG for multi-level image data, as well as JBIG, MMR, MH, or the like, for binary image data.

The scanner 214 scans and reads an image on an original using a CCD line sensor, thereby converting the read image to an electrical signal as raster image data. As a result of an original being set on a tray of an original feeder (not shown), and the user giving a reading start instruction through the operation unit 208, the CPU 201 gives an instruction to the scanner 214, the original is fed sheet-by-sheet, and an operation to read an original image is performed. Note that the reading method of the scanner 214 is not limited to the above-described one, and may alternatively be another method.

The printer 212 is a unit for printing raster image data on a recording medium, such as paper. Printing methods used by the printer 212 may include an electrophotographic method using a photosensitive drum and a photosensitive belt, an inkjet method in which ink is discharged from a minute nozzle array to directly print an image on a recording medium, and the like, and any of the methods may be employed. A print operation is started in accordance with an instruction from the CPU 201. Note that the printer 212 may have a plurality of paper feed stages such that different paper sizes or different paper directions can be selected, and may also have paper cassettes corresponding to these paper feed stages.

The operation unit 208 has an LCD (not shown), and a touch panel sheet is adhered onto the LCD. The operation unit 208 displays a system operation screen, and if a displayed key is pressed, the operation unit 208 notifies the CPU 201 of position information regarding the pressed key, via the operation unit I/F 207. The operation unit 208 also includes, as various operation keys, a start key, a stop key, an ID key, a reset key, and so on, for example. The start key is used when an operation to read an original image is started, for example. A two-color LED of green and red is provided at the center of the start key, and indicates whether or not the start key is in an available state, using these colors. The stop key has a function of stopping the operation that is being performed. The ID key is used to input a user ID of the user. The reset key is used when settings made through the operation unit 208 are initialized.

The card reader 219 reads information stored in an IC card (not shown) and notifies the CPU 201 of the read information via the external I/F 218, under the control of the CPU 201. Similarly, the NFC communication unit 221 communicates with a connectable terminal by means of short-range wireless and notifies the CPU 201 of the connectable terminal. The above configuration makes it possible to perform printing of print data received from the network 106, using the printer 212. Also, image data read by the scanner 214 can be faxed onto the public line by the modem 206, and received image data faxed from the public line can be output using the printer 212.

Information Processing Apparatus

Figure 3:
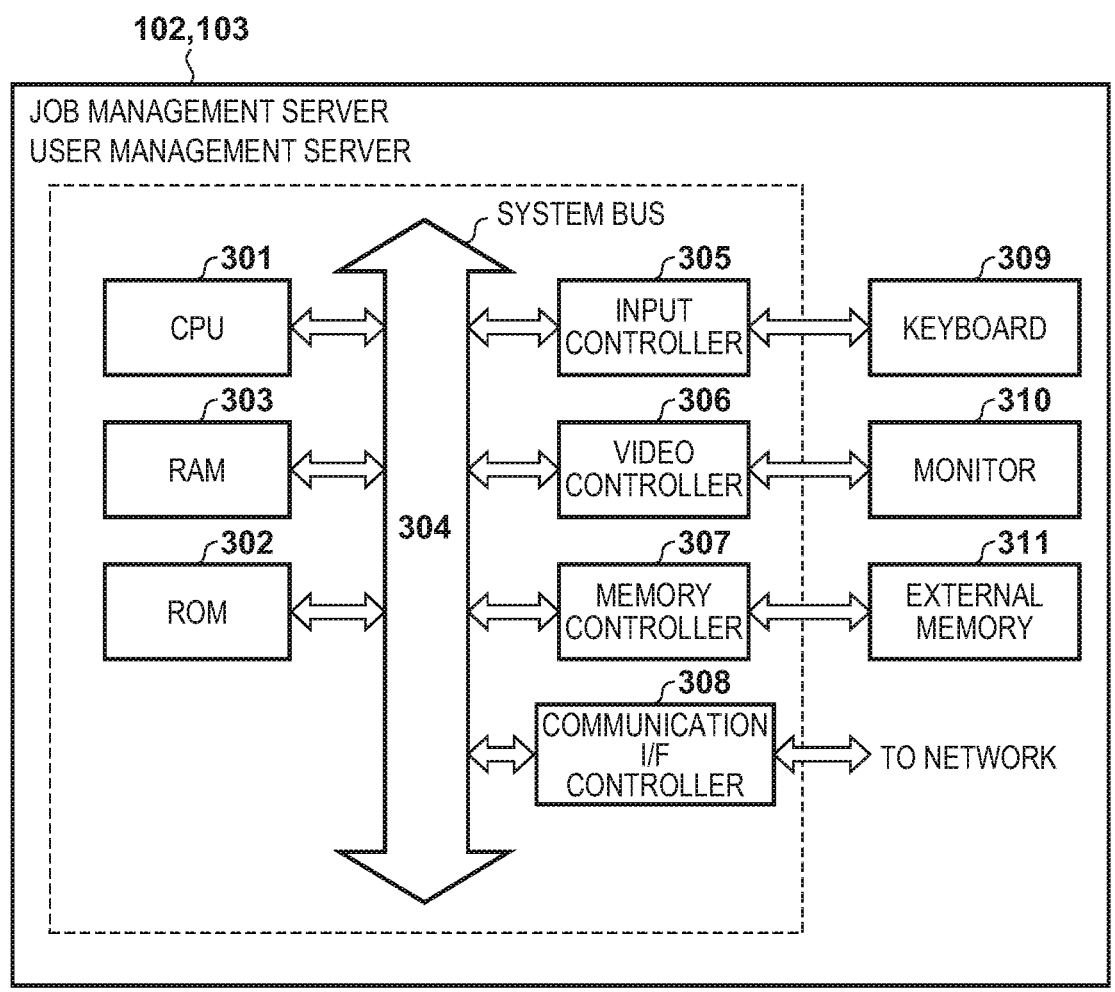
FIG. 3 shows an example of a hardware configuration of an information processing apparatus according to the present embodiment.

FIG. 3 is a block diagram showing an example of a hardware configuration of an information processing apparatus that can be applied to the print server 102 and the user management server 103 according to the present embodiment shown in FIG. 1. In FIG. 3, the CPU 301 comprehensively controls devices and controllers that are connected to a system bus 304. A BIOS (Basic Input/Output System), which is a control program for the CPU 301, an OS program, later-described various programs required to realize functions performed by respective servers or PCs, and the like, are stored in a ROM 302 or an external memory 311. A RAM 303 is a volatile storage area and functions as a main memory, a work area, or the like, of the CPU 301. The CPU 301 realizes various operations by loading programs or the like required to perform processing from the ROM 302 or the external memory 311 to the RAM 303, and executing the loaded programs. An input controller 305 controls input from a keyboard 309, a pointing device such as a mouse (not shown), or the like. A video controller 306 controls a display on a monitor 310. The monitor 310 is a display device such as a liquid crystal display or a CRT display, for example.

A memory controller 307 controls access to an external memory 311, such as a hard disk (HD), an SSD (Solid State Drive), or a SD memory card, for storing a boot program, various applications, font data, a user file, an edit file, various kinds of data, or the like. A communication I/F controller 308 is a control unit for connecting to, and communicating with, an external device via the network 106, and performs processing to control communication with the network. For example, the communication I/F controller 308 can perform communication using TCP/IP. Note that the CPU 301 enables a display on the monitor 310 by performing processing to develop (rasterize) an outline font on a display information area in the RAM 303, for example. The CPU 301 also enables a user to give an instruction using a mouse cursor (not shown) or the like on the monitor 310. Various programs according to the present embodiment are recorded in the external memory 311, and are executed by the CPU 301 by being loaded to the ROM 302 as needed. Furthermore, a definition file, various information tables, and the like, that are used when the aforementioned programs are executed are also stored in the external memory 311.

Mobile Terminal Device

FIG. 4 is a block diagram showing an example of a hardware configuration of the mobile terminal device 105 according to the present embodiment shown in FIG. 1. A flash 403 is a storage unit for storing various programs. In the mobile terminal device 105, an SoC (System on a chip) 401 is a hardware element that mainly performs processing, and a program stored in the flash 403 is a software element that mainly performs control. An NFC unit 406 is a communicating unit that performs short-range wireless communication with an external device, conforming to an NFC standard. A WiFi unit 405 is a communicating unit that performs wireless communication via the access point 104, conforming to a Wi-Fi (registered trademark) standard. A Bluetooth unit 404 is a communicating unit that communicates with an external device, conforming to a Bluetooth (registered trademark) standard.

A program is loaded to a RAM 402, and is interpreted by the SoC 401 to perform various kinds of processing. A power source unit 407 is a power source for supplying necessary electric power to each unit of the mobile terminal device 105. A sound input-output unit 408 includes a microphone, a speaker, or the like, and is used to input and output sound. A touch panel 409 is an operation input unit for the user to make an operation with a finger. An LED (Light Emitting Diode) 410 functions as a display unit and is used for various displays. A camera 411 is an image capture unit for shooting pictures and moving images. A sensor 412 is a detection unit that includes a GPS (Global Positioning System), an acceleration sensor, a magnetic field sensor, a proximity sensor, or the like. Each unit is connected to the SoC 401, and the SoC 401 controls each unit and causes each unit to make input and output. The mobile terminal device 105 can connect to the network 106 via the access point 104. In the present embodiment, a configuration of a smartphone is assumed as an example of the mobile terminal device 105, but this may not be the case. For example, the mobile terminal device 105 may alternatively be a terminal device such as a tablet terminal that has the above-described configuration of the information processing apparatus.

Summary of Processing

Figure 5A:
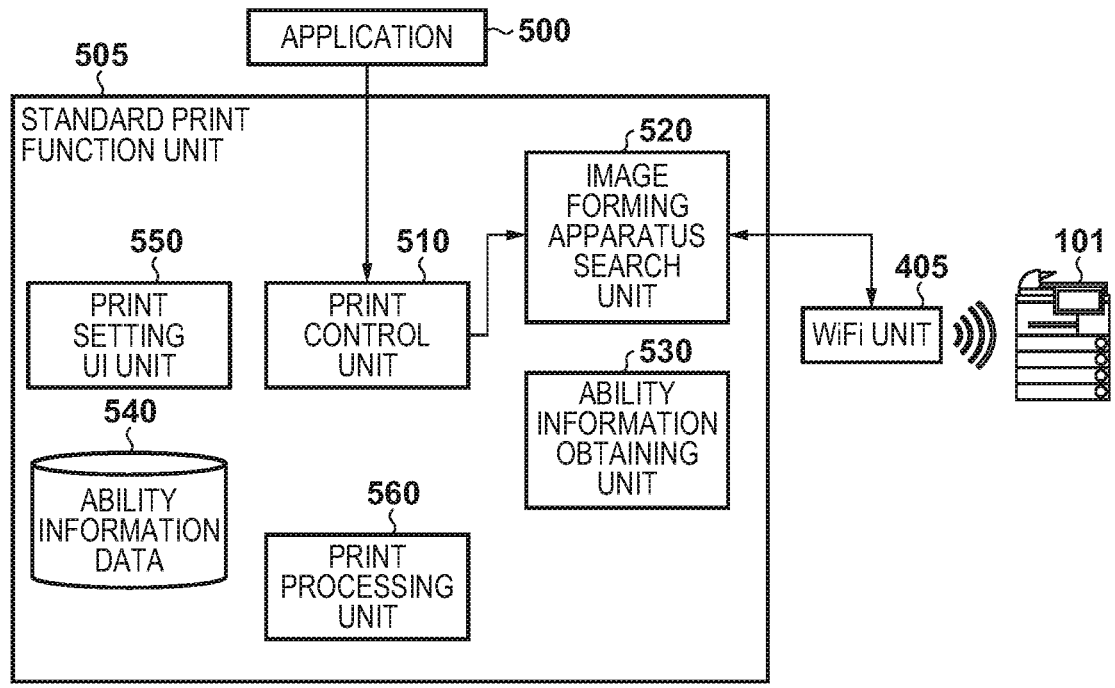
FIGS. 5A, 5B, and 5C are block diagrams illustrating various kinds of processing performed by the image forming apparatus according to the present embodiment.
Figure 5B:
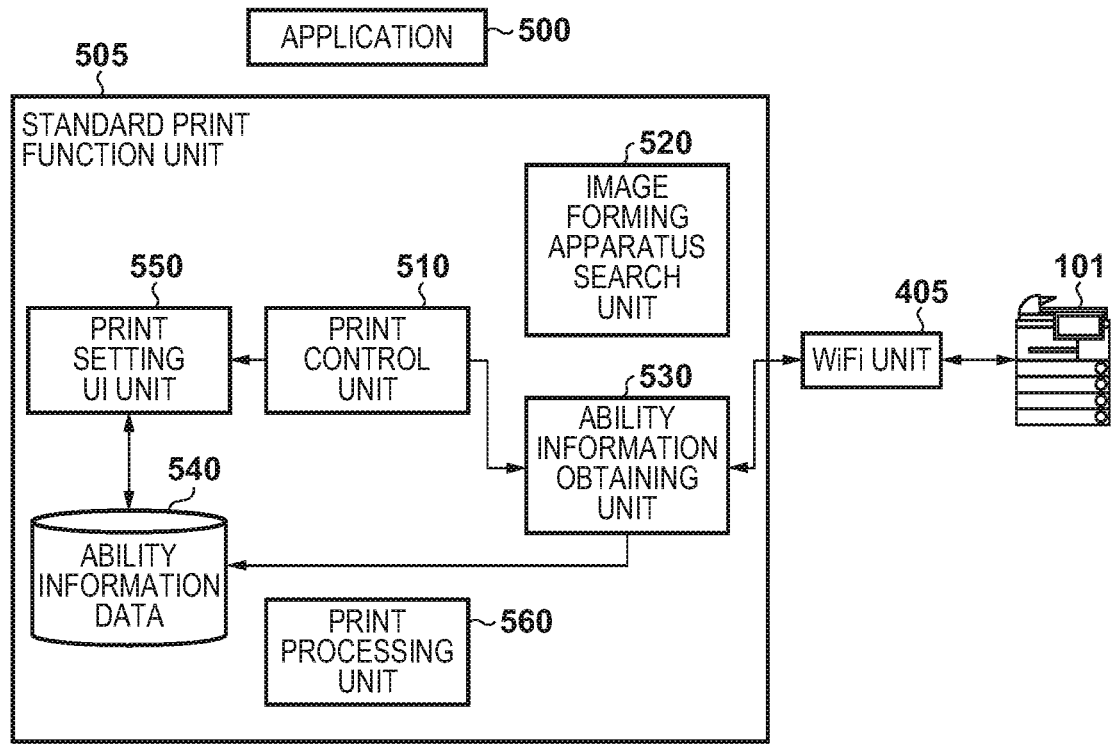
Figure 5C:
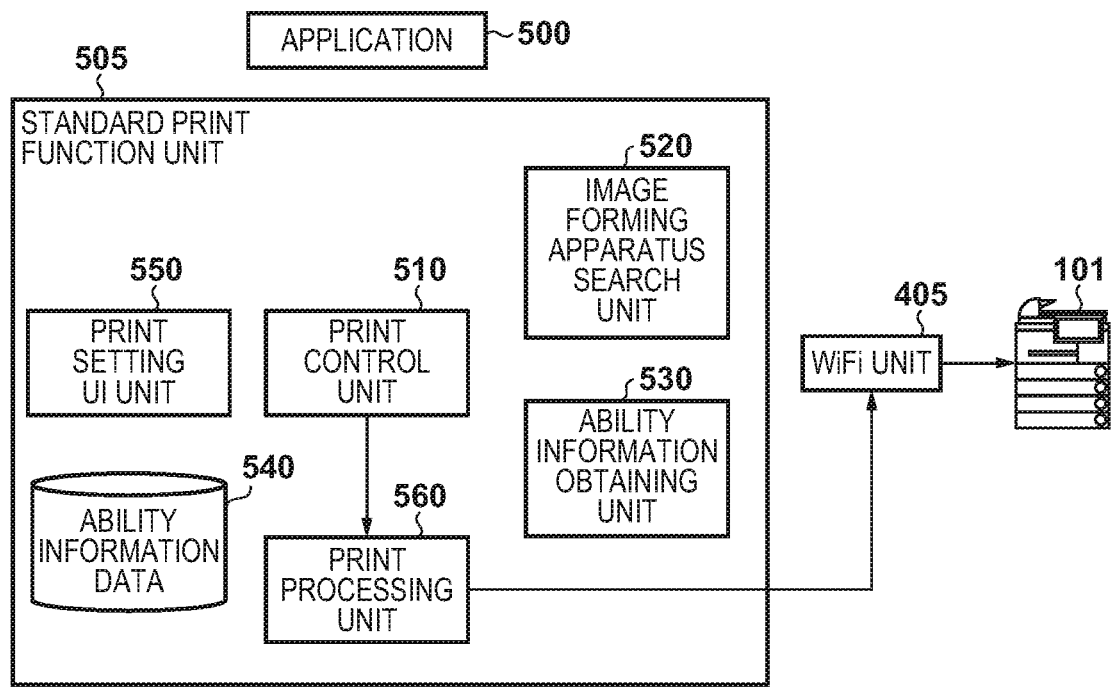

FIGS. 5A to 5C are block diagrams of a print processing system using a standard print function unit 505 provided in the mobile terminal device 105. The mobile terminal device 105 is provided with an application 500 and the standard print function unit 505. The standard print function unit 505 can be linked with the WiFi unit 405. The application 500 is an application with which a print function can be used. The application 500 and the standard print function unit 505 are realized by the SoC 401 executing corresponding programs, for example.

The standard print function unit 505 includes a print control unit 510, an image forming apparatus search unit 520, an ability information obtaining unit 530, ability information data 540, a print setting UI unit 550, and a print processing unit 560. Operations performed by the standard print function unit 505 are divided roughly into three steps.

Step A: To search a network for image forming apparatuses and determine an image forming apparatus for output Step B: To obtain ability information regarding the image forming apparatus for output, and form a UI (user interface)

Step C: To send a print job to the image forming apparatus for output

Each of these processes will be described with reference to FIGS. 5A to 5C.

First, a flow of the aforementioned step A will be described with reference to FIG. 5A. If a print instruction is given from the application 500, the print control unit 510 calls the image forming apparatus search unit 520, and searches for image forming apparatuses that exists on the network 106, through the WiFi unit 405. The image forming apparatus search unit 520 provides an image forming apparatus search function that is preinstalled in the mobile terminal device 105, and searches for an image forming apparatus in the network 106 in accordance with a request from the application 500. In the present embodiment, it is envisioned that the image forming apparatus search unit 520 searches for an image forming apparatus using Bonjour, which is a standard search protocol, but this may not be the case. The mobile terminal device 105 displays image forming apparatuses that have been found as a result of the search such that these apparatuses can be selected on the touch panel 409, and accepts a user's selection of an image forming apparatus for output.

Next, a flow of the step B will be described with reference to FIG. 5B. After the image forming apparatus for output has been determined (i.e. after the step A), the print control unit 510 obtains, via the ability information obtaining unit 530, ability information from the image forming apparatus for output, and stores the obtained ability information in the ability information data 540. The ability information regarding an image forming apparatus refers to a color printing ability, a duplex printing ability, or the like, and refers to information indicating specifications of the image forming apparatus. That is to say, different image forming apparatuses have different ability information. Furthermore, in the present embodiment, information that is to be transmitted and received between the image forming apparatus and the mobile terminal device here includes information indicating a destination to which a job is to be sent, and user information to be used in the pull-printing system, in addition to the ability information. Thereafter, the print control unit 510 causes the print setting UI unit 550 to create a UI (User Interface) using the stored ability information data 540. For example, if a color printing ability is available, the print setting UI unit 550 forms a UI so as to display a "color selection" item. The mobile terminal device 105 displays the formed UI on the touch panel 409, and accepts input from the user.

Lastly, a flow of the step C will be described with reference to FIG. 5C. Upon receiving a print instruction from the user via the displayed UI, the print control unit 510 delivers print data to the print processing unit 560. The print processing unit 560 convers the format of content to be printed that is delivered from the application 500 to a standard print format, using the standard print function that is preinstalled in the mobile terminal device 105. The print processing unit 560 then sends the converted data to the image forming apparatus in accordance with a standard print protocol. In the present embodiment, a PDF format, PWG-Raster, and IPP are envisioned, respectively, as the format of the content to be printed that is delivered from the application 500, the standard print format, and the standard print protocol, but this need not be the case. The converted data is sent to the image forming apparatus 101 through the WiFi unit 405.

Pull-Printing Operation

An overall flow of pull-printing according to the present embodiment will be described below with reference to FIG. 6.

First, the user starts the application 500 that is installed in the mobile terminal device 105 and with which the user wants to use the print function, and gives a print instruction on the application 500 (1). The mobile terminal device 105 performs a search using the image forming apparatus search function of the standard print function unit 505 based on the print instruction, and waits for a response from image forming apparatuses that are connected to the network 106. In the present embodiment, the case is envisioned where a response is received from the image forming apparatus 101, and this image forming apparatus 101 is detected (2).

The standard print function unit 505 presents the search result to the user (3). Here, it is assumed that the image forming apparatus 101 has been detected and is selectably presented on the display unit to the user. The user determines a target image forming apparatus via the application 500 (4). The standard print function unit 505 makes an inquiry about ability information regarding the determined target image forming apparatus 101, to the image forming apparatus 101 (5).

In response to the inquiry from the mobile terminal device 105, the image forming apparatus 101 makes an inquiry about user information regarding the user of the mobile terminal device 105, to the user management server 103 via a panel application 650 (6). As mentioned above, it is assumed that information regarding the mobile terminal device 105 and information regarding the user who uses the mobile terminal device 105 are registered in the user management server 103. The panel application 650 is an application that works on the image forming apparatus 101, has information regarding the print server 102 and the user management server 103, to which inquiries are to be made, and performs a function of making access through an appropriate I/F. Here, the panel application 650 makes an inquiry to the user management server 103, using information included in the inquiry accepted from the mobile terminal device 105. Note that, if information required for the inquiry is not included, the image forming apparatus 101 may make a request for the required information to the mobile terminal device that has made the inquiry.

A user management server application 620 in the user management server 103 accepts the inquiry from the image forming apparatus 101. Furthermore, the user management server application 620 obtains corresponding user information from a user management DB 630, using the user information regarding the mobile terminal device 105 that is included in that inquiry (7). In the user management DB 630, the mobile terminal device 105 is associated with the user, and here, user information is obtained using information regarding the mobile terminal device 105 (e.g. identification information regarding the mobile terminal device 105) as a key. At this time, if, for example, the user is not registered in the user management server 103, this user may be dealt with as a user who is not permitted to perform printing. Even in the case of a registered user, permission and non-permission of printing through pull-printing may be defined based on a contraction, an expiration period, or the like.

The user management server application 620 sends back, to the image forming apparatus 101, the user information obtained from the user management DB 630 as a response to the inquiry (8). The image forming apparatus 101 returns, as ability information, the user information received via the panel application 650, abilities of the image forming apparatus 101 itself, and an address (destination information) of the print server 102, which is a destination to which a job is to be sent, to the mobile terminal device 105 (9). In the present embodiment, the image forming apparatus 101 returns the ability information to the mobile terminal device 105 after identifying the user by using the information regarding the mobile terminal device 105 (e.g. identification information regarding the mobile terminal device 105). However, the present invention is not limited to this configuration, and for example, the mobile terminal device 105 may hold user information in advance, and send a job using this information.

The mobile terminal device 105 forms a UI based on the returned ability information using the standard print function unit 505, and presents the UI to the user. The UI here is configured to correspond to abilities (functions) of the image forming apparatus, such as set items that can be performed by the image forming apparatus 101, and set values. The mobile terminal device 105 then accepts a job-sending instruction made to the UI from the user, via the application 500 (10). The standard print function unit 505 of the mobile terminal device 105 sends a job to the print server 102 using the destination information regarding the print server 102 that is indicated by the ability information (11). Upon receiving the print job from the mobile terminal device 105, a print server application 600 in the print server 102 performs processing to register the received print job to the job management DB 610 (12).

Here, processing from (5) to (11) will be described in detail with reference to the flowchart in FIG. 7. FIG. 7 is a flowchart related to the ability information response from the target image forming apparatus and the sending of the job between the mobile terminal device 105 and the image forming apparatus 101. This processing is started due to job-sending processing being started by the mobile terminal device 105 after the search for image forming apparatuses has been finished and the user has determined the target image forming apparatus. In FIG. 7, SA indicates processing performed by the mobile terminal device 105, and SB indicates processing performed by the image forming apparatus 101. Broken line arrows indicate transmission and reception of data between the apparatuses.

In step SA701, the mobile terminal device 105 makes an inquiry about abilities of the image forming apparatus 101. This process corresponds to (5) in FIG. 6. As mentioned above, the inquiry here includes information regarding the mobile terminal device 105 (e.g. identification information regarding the mobile terminal device 105).

Ability information response processing is started by the image forming apparatus 101 in response to the inquiry from the mobile terminal device 105.

In step SB701, the image forming apparatus 101 receives the inquiry from the mobile terminal device 105.

In step SB702, the image forming apparatus 101 determines whether only printing performed via the print server 102 is permitted in the current environment. As mentioned above, the pull-printing system in which printing is performed via the print server 102 corresponds to an environment in which printing from something other than the print server 102 is restricted. This is a mechanism that is set such that a system administrator can appropriately manage jobs. This mechanism is realized by configuring a setting such that printing is not performed based on a request from an IP address other than that of the print server 102, for example. The processing proceeds to step SB707 if it is determined that printing from something other than the print server 102 is permitted (YES in step SB702), and proceeds to step SB703 if not (NO in step SB702).

In step SB707, the image forming apparatus 101 prepares connection information for connecting to this image forming apparatus 101. In the present embodiment, it is envisioned that IPP (Internet Printing Protocol) is used to send data. In the case of using an IP address as connection information, if the IP address of the image forming apparatus 101 is "192.168.xxx.xxx", information "http://192.168.xxx.xxx/ipp" is prepared. In this case, the mobile terminal device 105 directly sends a print job to the image forming apparatus 101. Note that the protocol to be used to send data is not limited to IPP. Thereafter, the processing proceeds to step SB708.

In step SB703, the image forming apparatus 101 makes an inquiry about user information regarding the mobile terminal device 105 to the user management server 103, and obtains the user information. Here, the information regarding the mobile terminal device 105 obtained in step SB701 is used for this inquiry.

In step SB704, the image forming apparatus 101 determines whether or not the user who has sent the inquiry received in step SB701 is a user who can print, based on the user information obtained from the user management server 103. The processing proceeds to step SB705 if it is determined that the user is one who can print (YES in step SB704), and proceeds to step SB706 if it is determined that the user is one who cannot print (NO in step SB704).

In step SB705, the image forming apparatus 101 prepares connection information regarding the print server 102. As mentioned above, in the present embodiment, it is envisioned that IPP is used to send data. In the case of using an IP address as connection information, if the IP address of the print server 102 is "192.168.yyy.yyy", information "http://192.168.yyy.yyy/ipp" is prepared. In this case, the mobile terminal device 105 sends the print job to the image forming apparatus 101 via the print server 102. Thereafter, the processing proceeds to step SB708.

In step SB706, the image forming apparatus 101 prepares information indicating that printing is not permitted. Then, the processing proceeds to step SB708.

In step SB708, the image forming apparatus 101 returns the information that has been prepared during processing performed thus far to the mobile terminal device 105 that has made the inquiry. Then, the ability information response processing performed by the image forming apparatus 101 ends.

In step SA702, the mobile terminal device 105 receives the information sent from the image forming apparatus 101.

In step SA703, the mobile terminal device 105 sends the job using the received information. The destination to which the job is sent is either the image forming apparatus 101 or the print server 102 in accordance with the address (IP address) indicated by the information. At this time, if the received information indicates that printing cannot be performed, the mobile terminal device 105 may also display a UI to prompt the user to confirm. Then, the job-sending processing performed by the mobile terminal device 105 ends.

Now, a description is given again with reference to FIG. 6. After the registration of the print job performed by the print server 102 has been finished, the user instructs the image forming apparatus 101 to perform output processing, using the pull-printing system (13). Various means are available to give an output instruction, and for example, the user may be recognized by causing the card reader mounted in the image forming apparatus 101 to read the user information. Also, the NFC unit 406 provided in the mobile terminal device 105 may be read through the NFC communicating unit 221 of the image forming apparatus 101 to recognize the user.

After recognizing the user, the image forming apparatus 101 makes an inquiry about job information to the print server 102 (14). The print server 102 accesses the job management DB 610 through the print server application 600 (15). The print server 102 sends back the job information regarding the corresponding user to the image forming apparatus 101 (16). Then, the image forming apparatus 101 performs output processing based on the job information sent from the print server 102 (17).

Figure 6:
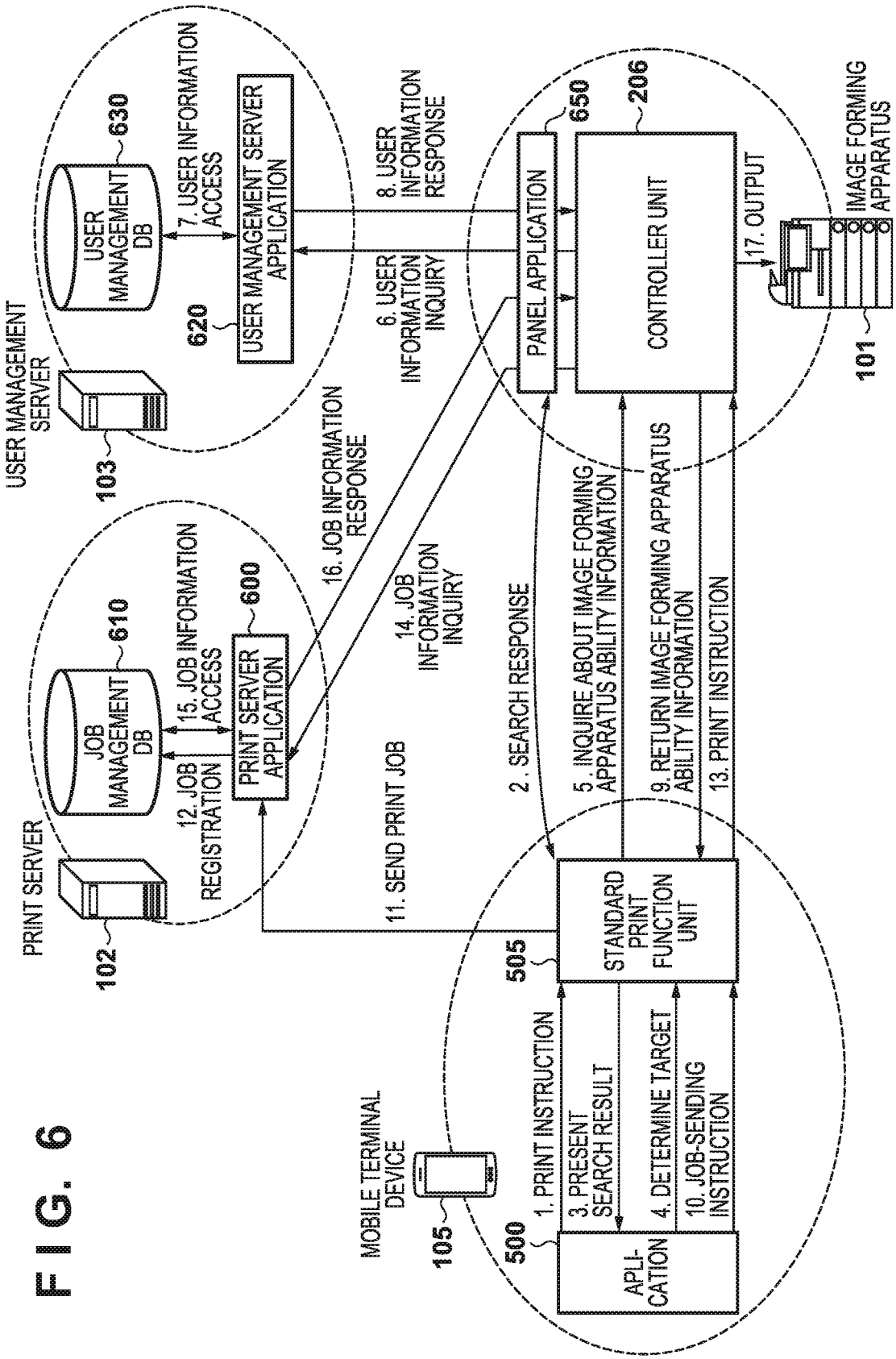
FIG. 6 is a flow diagram illustrating an overall flow in a pull-printing system according to the present embodiment.

Note that the flow shown in FIG. 6 applies when processing in step SB705 in FIG. 7 is performed. Accordingly, if processing in step SB707 in FIG. 7 is performed, processing in (11) and subsequent processing in FIG. 6 is not performed, and a print instruction is given to the image forming apparatus 101 after the print job is directly sent from the mobile terminal device 105 to the image forming apparatus 101. Also, processing in (11) and subsequent processing in FIG. 6 is not performed in the case where processing in step SB706 in FIG. 7 is performed, and, for example, error processing will be performed in this case.

In the present embodiment, it is envisioned that the format of a print job generated by the print processing unit 560 of the standard print function unit 505 is PWG-Raster, which is a standard format. However, if, for example, the print server 102 is equipped with a printer driver (not shown), a print job may be rendered again by the printer driver using PDF (Portable Document Format), which can be dealt with as an intermediate spooling format, to perform printing. In other words, a configuration may be employed in which the data format to be used in a print job sent from the mobile terminal device is changed between printing performed via the print server 102 in a pull-print environment and printing for which a print job is directly sent to the image forming apparatus 101. In this case, higher-quality printing can be performed than printing using PWG-Raster, which is a standard format.

As described above, according to the present embodiment, printing can be performed from the mobile terminal device 105 using the standard print function unit 505 without impairing convenience, even in an environment in which a pull-printing system is constructed. Furthermore, more appropriate print settings can be configured by obtaining abilities of the image forming apparatus 101 from the actual device. Also, the user of the mobile terminal device that sends a print job can be managed appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060734, filed Mar. 27, 2018, which is hereby incorporated by reference herein in its entirety.

What is claimed is:

1. A printing system that includes a terminal device, an image forming apparatus, and a server,
the terminal device comprising:
a processor and a memory storing instructions which, when executed by the processor of the terminal device, cause the terminal device to:
transmit a first inquiry for detecting the image forming apparatus;
receive a first response to the first inquiry from the image forming apparatus;

transmit a second inquiry to the image forming apparatus;
receive information specifying the server as a destination of print data; and
send print data to the server specified by the received information, and the image forming apparatus comprising:
a processor and a memory storing instructions which, when executed by the processor of the image forming apparatus, cause the image forming apparatus to:
receive the first inquiry from the terminal device;
transmit the first response to the terminal device;
receive the second inquiry from the terminal device that has received the first response;
transmit the information specifying the server as a destination of print data to be transmitted from the terminal device as a second response to the received second inquiry, wherein the information was stored in the image forming apparatus before the first inquiry was received;
acquire, from the specified server, the print data the terminal device has transmitted to the specified server; and
execute a printing process based on the acquired print data.

2. The printing system according to claim 1,
wherein the instructions stored in the memory of the image forming apparatus, when executed by the processor of the image forming apparatus, further cause the image forming apparatus to determine whether or not printing performed not via the server is permitted, and
if it is determined that printing performed not via the server is not permitted, the image forming apparatus transmits the information specifying the server as a destination of print data as the second response to the second inquiry.

3. The printing system according to claim 2,
wherein if it is determined that printing performed not via the server is not permitted, the image forming apparatus further determines whether or not a user of the terminal device that has transmitted the second inquiry is permitted to perform printing via the server, and
if it is determined the user is permitted to perform printing via the server, the image forming apparatus transmits the information specifying the server as a destination of print data as the second response to the second inquiry.

4. The printing system according to claim 3,
wherein if it is determined the user is not permitted to perform printing via the server, the image forming apparatus transmits information specifying the image forming apparatus as a destination of print data to be transmitted from the terminal device in a response to the received second inquiry.

5. The printing system according to claim 2,
wherein if it is determined that printing performed not via the server is permitted, the image forming apparatus transmits information specifying the image forming apparatus as a destination of print data to be transmitted from the terminal device in a response to the received second inquiry.

6. The printing system according to claim 1,
wherein if the print data is sent to the server, the terminal device also sends information needed for printing performed via the server together.

7. The printing system according to claim 2,
wherein the instructions stored in the memory of the image forming apparatus, when executed by the processor of the image forming apparatus, further cause the image forming apparatus to obtain information regarding a user of the terminal device, and
the image forming apparatus determines whether or not the user is permitted to perform printing via the server, based on the obtained information regarding the user.

8. The printing system according to claim 1,
wherein the instructions stored in the memory of the image forming apparatus, when executed by the processor of the image forming apparatus, further cause the image forming apparatus further to:
accept a print instruction; and
perform a print process corresponding to the print instruction,
if the print data corresponding to the print instruction has been sent to the image forming apparatus, the image forming apparatus performs the print job, and
if the print job corresponding to the print instruction has been sent to the server, the image forming apparatus acquires the print data from the server and thereafter performs the print process based on the print data.

9. The printing system according to claim 1,
wherein the instructions stored in the memory of the terminal device, when executed by the processor of the terminal device, further cause the terminal device to:
search for an image forming apparatus; and
accept, from a user, selection of an image forming apparatus to which an inquiry is to be transmitted by the terminal device out of one or more detected image forming apparatuses.

10. The printing system according to claim 1,
wherein the image forming apparatus transmits information of at least an ability of the image forming apparatus in the second response to the second inquiry, and
wherein the instructions stored in the memory of the terminal device, when executed by the processor of the terminal device, further cause the terminal device to display a user interface for configuring a print setting corresponding to the image forming apparatus and present the displayed user interface, based on the information regarding the information of the ability of the image forming apparatus.

11. The printing system according to claim 1,
wherein the terminal device changes a data format of the print data in accordance with a transmission destination.

12. A printing method to be performed in a printing system that includes a terminal device, an image forming apparatus, and a server, the method comprising:
transmitting a first inquiry for detecting the image forming apparatus;
receiving a first response to the first inquiry from the image forming apparatus;
transmitting a second inquiry to the image forming apparatus, by the terminal device;
receiving information specifying the server as a destination of print data, by the terminal device;
sending print data to the server specified by the received information;
receive the first inquiry from the terminal device, by the image forming apparatus;
transmit the first response to the terminal device, by the image forming apparatus;

receiving the second inquiry from the terminal device that has received the first response, by the image forming apparatus;

transmitting the information specifying the server as a destination of print data to be transmitted from the terminal device as a second response to the second received inquiry, by the image forming apparatus, wherein the information was stored in the image forming apparatus before the first inquiry was received;

acquiring, from the specified server, the print data the terminal device has transmitted to the specified server, by the image forming apparatus; and executing a printing process based on the acquired print data, by the image forming apparatus.

13. An image forming apparatus capable of communicating with a terminal device and a server, the apparatus comprising:

a processor and a memory storing instructions which, when executed by the processor, cause the image forming apparatus to:

receive a first inquiry from the terminal device for detecting the image forming apparatus;

transmit a first response to the received first inquiry;

receive a second inquiry from the terminal device that received the first response;

transmit information specifying the server as a destination of print data to be transmitted from the terminal device as a second response to the received inquiry, wherein the information was stored in the image forming apparatus before the first inquiry was received;

acquire, from the specified server, the print data the terminal device has transmitted to the specified server; and execute a printing process based on the acquired print data.

14. The image forming apparatus according to claim 13, wherein the instructions stored in the memory, when executed by the processor, further cause the image forming apparatus to determine whether or not printing performed not via the server is permitted, wherein if it is determined that printing performed not via the server is not permitted, the image forming apparatus transmits information specifying the server as a destination of print data in the second response to the second inquiry.

15. A method for controlling an image forming apparatus capable of communicating with a terminal device and a server, the method comprising:

receiving a first inquiry from the terminal device for detecting the image forming apparatus;

transmitting a first response to the received first inquiry;

receiving a second inquiry from the terminal device that received the first response;

transmitting information specifying the server as a destination of print data to be transmitted from the terminal device as a second response to the received second inquiry, wherein the information was stored in the image forming apparatus before the first inquiry was received;

acquiring, from the specified server, the print data the terminal device has transmitted to the specified server; and executing a printing process based on the acquired print data.

16. The control method according to claim 15, further comprising:

determining whether or not printing performed not via the server is permitted, wherein, if it is determined, during the determining, that printing performed not via the server is not permitted, information specifying the server as a destination of print data is transmitted as the second response to the second inquiry.

17. A non-transitory computer-readable medium storing a program for causing a computer to:

receive a first inquiry from the terminal device for detecting the image forming apparatus;

transmit a first response to the received first inquiry;

receive a second inquiry from a terminal device that received the first response;

transmit information specifying a server as a destination of print data to be transmitted from the terminal device as a second response to the received second inquiry, wherein the information was stored in the image forming apparatus before the first inquiry was received;

acquire, from the specified server, the print data the terminal device has transmitted to the specified server; and execute a printing process based on the acquired print data.

18. The non-transitory computer-readable medium according to claim 17, wherein the program further causes the computer to:

determine whether or not printing performed not via the server is permitted, wherein, if it is determined that printing performed not via the server is not permitted, information specifying the server as a destination of print data is transmitted as the second response to the second inquiry.

19. The image forming apparatus according to claim 14, wherein the instructions stored in the memory, when executed by the processor, further cause the image forming apparatus to determine whether or not printing performed not via the server is permitted, wherein if it is determined that printing performed not via the server is permitted, the image forming apparatus transmits the information specifying the image forming apparatus as a destination of print data as the second response to the received second inquiry.

20. The image forming apparatus according to claim 13, wherein the second inquiry is an inquiry for obtaining capability information of the image forming apparatus to be used for displaying a print setting screen.

21. The image forming apparatus according to claim 13, wherein the information specifying the server as a destination of print data to be transmitted from the terminal device includes an IP address of the server.

22. The image forming apparatus according to claim 20, wherein the capability information includes information regarding a color printing ability.

* * * * *